April 6, 1965 R. D. TRUPP 3,176,800
DAMPING MEANS
Original Filed Dec. 9, 1959 3 Sheets-Sheet 1
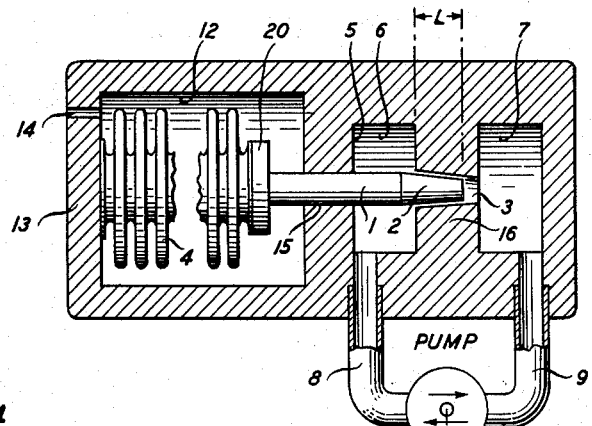
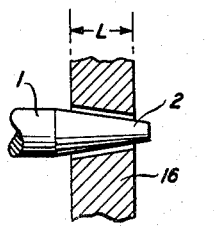
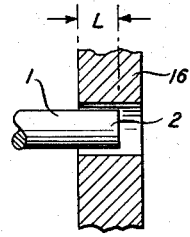
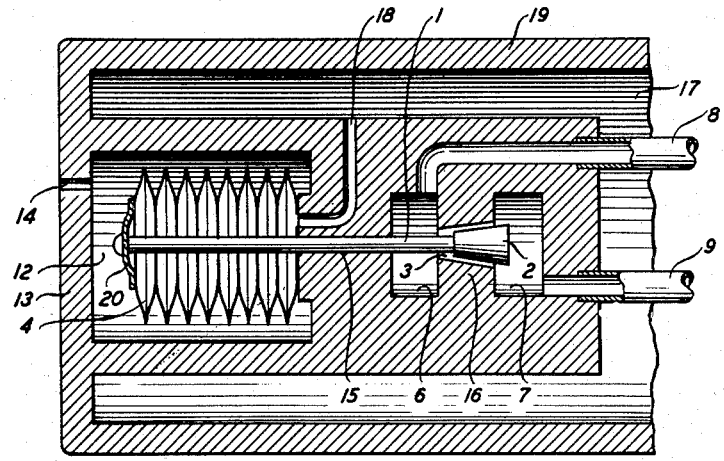
INVENTOR
R. D. TRUPP
BY
Walter M. Thiel
ATTORNEY

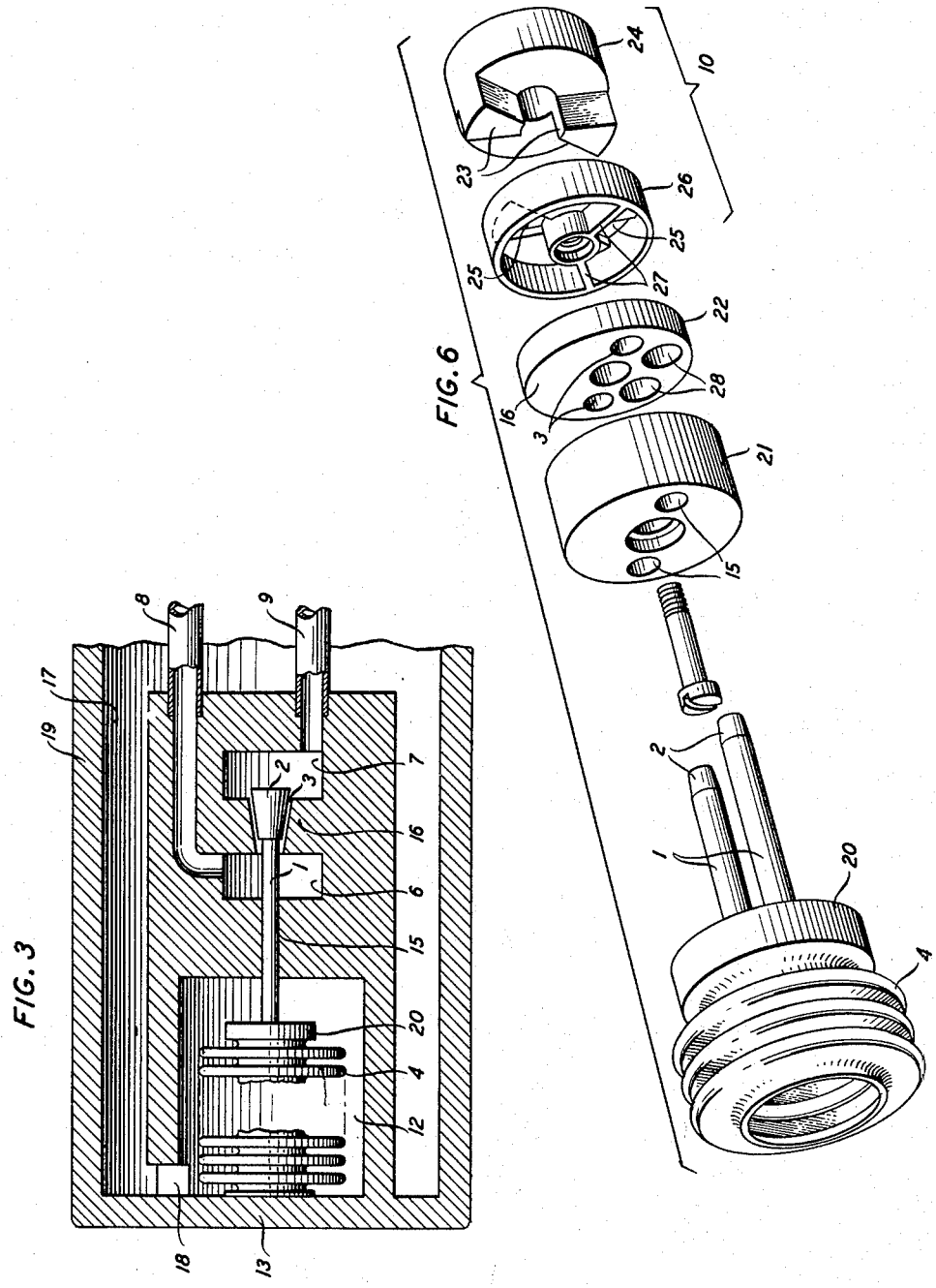

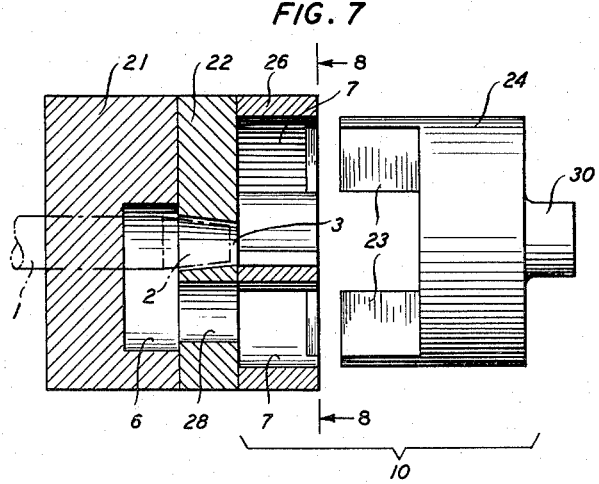
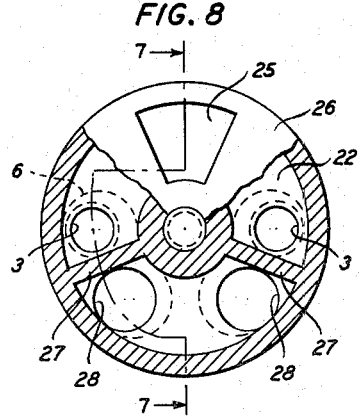
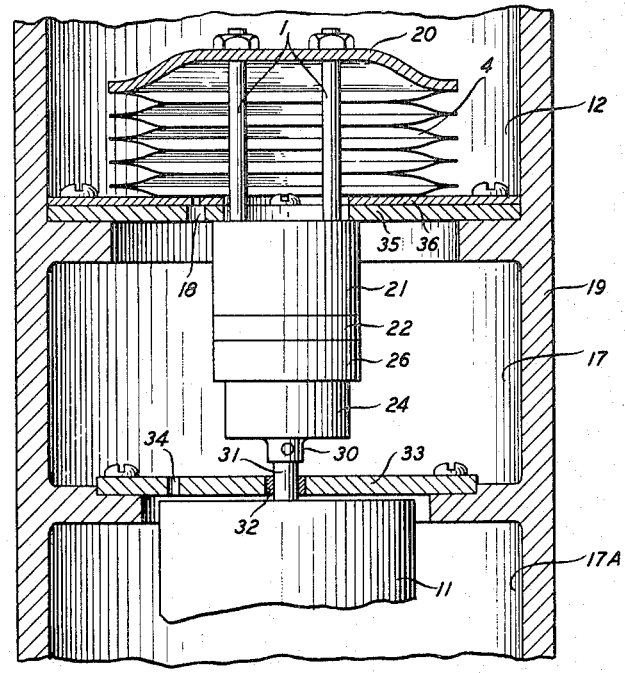

United States Patent Office 3,176,800
Patented Apr. 6, 1965

3,176,800
DAMPING MEANS
Ronald D. Trupp, Morris Plains, N.J., assignor, by mesne assignments, to the United States of America as represented by the Secretary of the Army
Continuation of application Ser. No. 858,549, Dec. 9, 1959. This application Oct. 25, 1963, Ser. No. 320,253
1 Claim. (Cl. 188—93)

This application is a continuation of application Serial No. 858,549 filed December 9, 1959.

This invention relates to damping mechanism and more particularly to a damping mechanism preferably of the rotary type, for damping the mechanical excursions of mechanisms.

Automatic damping of mechanisms such as those used in gyroscopes and accelerometers is necessary to maintain required precision under dynamic conditions. Rotary type dampers are usually used for this purpose. Proper damping of such structures requires that the damping torque applied to the mechanism be proportional to its velocity. Mathematically, this is stated as $T=C\theta$, where T is the torque provided by the damper, C is the damping coefficient of the damper and $\theta$ is the instantaneous angular velocity of the mechanism to be damped. To satisfy the above expression, it is essential that the coefficient C be independent of both the angular velocity of the mechanism to be damped and the environmental temperature. Damping mechanisms used for such structures usually involve the use of a liquid damping means and silicone oil is most frequently used for this purpose because of its relatively small change in viscosity with temperature. In order to meet these two requirements, the damping means must be capable of automatically correcting for the changes in oil viscosity and must also be so constructed as to be substantially insensitive to the rate of flow of the oil which, of course, is proportional to the angular velocity of the mechanism to be damped.

It is an object of this invention to damp the motion of a mechanism over wide temperature and velocity ranges.

The foregoing object is achieved by this invention by means comprising a pump driven by the mechanism to be damped for forcing the damping liquid through a conical valve port having a flow path length large compared to its radial opening so as to assure a substantially uniform laminar flow. A temperature sensitive mechanism controls either the radial spacing, the flow path length or both to substantially compensate for changes in fluid viscosity.

The invention may be better understood by reference to the accompanying drawings in which:

FIGURE 1 is an elementary schematic illustrating the fundamental principles of the invention;

FIGURE 2 is another schematic illustration of a modification of the invention in which the conical valve is reversed and driven by a different type of temperature responsive bellows;

FIGURE 3 is a still further and a preferred embodiment of the invention which differs from FIGURE 2 in that the system may be completely sealed;

FIGURE 4 illustrates a variation in the valve construction wherein the valve length remains constant while the radial spacing is varied with temperature, FIGURE 5 illustrates a valve structure in which the radial spacing remains constant but the valve length varies with temperature;

FIGURE 6 is illustrative of the principal parts of a practical embodiment of the invention in which two conically shaped valves are used;

FIGURES 7 and 8 disclose sections through the embodiment of FIGURE 6 with most of the parts assembled; and FIGURE 9 discloses a partial assembly of another practical embodiment of the invention.

Referring now to FIGURE 1, a cylindrical valve rod 1 having a conical portion 2 positioned within a complementary tapered port 3 is shown in association with a bellows mechanism 4 for closing the valve as the temperature increases. Valve rod 1 is supported in wall 5 by a guide bearing 15 which maintains the valve rod concentric with its port 3 in partition 16. It will be observed that the radial spacing between the conical valve 2 and the conical port 3 is uniform and is relatively small compared with the length L of the valve channel. As is well known, laminar flow occurs through such passageways when the Reynold's number is below a critical value. This Reynold's number has been defined as equal to the product of the flow velocity, the width of the opening, the density of the fluid and the reciprocal of the fluid viscosity. It is thus apparent that, for a given damping fluid, the Reynold's number may be kept low if the fluid velocity and the width of the opening can both be kept relatively small. In the present invention, the width dimension is kept small by keeping the radial clearance in the valve port small while the flow velocity is kept small by making the valve diameter large enough.

Referring again to FIGURE 1 it will be noted that at either side of the valve will be found a pair of chambers 6 and 7 which communicate with each other through the conical valve opening in partition 16. Fluid is driven between these two chambers through the valve port by means of a pump 10 which can reversibly drive the fluid between the chambers by reason of its communication therewith through conduits 8 and 9. A mechanism 11 to be damped is mechanically coupled through a shaft or other mechanical link 31 to the pump to drive the pump whenever the mechanism moves. Because of the small clearance betwen the valve port and the valve rod, the flow of fluid between chambers 6 and 7 passing through the valve will be laminar in nature. Since the cross-section area of the valve channel is large enough, no appreciable turbulence is produced so that the damping coefficient will not be appreciably affected by the flow velocity between the two chambers.

Temperature correction is provided by the bellows mechanism 4 in FIGURE 1. It is to be understood that bellows 4 is adapted to expand linearly as temperature increases, thereby driving valve rod 1 toward the right. It should also be understood that the thermal conduction between the damping fluid and this bellows is sufficiently good that the bellows temperature will remain substantially equal to the damping fluid temperature. The space 12 surrounding the bellows is open to atmosphere by reason of a vent 14 in the back wall 13 of the casing. In operation, as the fluid temperature increases, thus reducing its viscosity, the bellows expands to both increase the length dimension L and reduce the cross-section clearance between the conical valve 2 and its port 3. It can be shown that these parameters are so related that they substantially completely compensate for the temperature variable so that the damping coefficient remains substantially unchanged.

A variation of the valve mechanism is disclosed in FIGURE 2. The conical valve section 2 is shown reversed with respect to its arrangement in FIGURE 1 so that it tends to close the valve port as valve rod 1 is drawn to the left. In this embodiment, it is assumed that the enclosure 19 contains both the pump and the mechanism to be damped and that they are completely surrounded by a suitable damping fluid to protect them. The pump and damping mechanism are not shown in this figure as they are contained in the portion of enclosure 19 extending to the right. The fluid surrounding these parts also completely fills the space 17 within the enclosure 19. The bellows 4 in this figure is of the type in which the fluid fills its interior while the space 12 surrounding the bellows may be made open to atmosphere by reason of vent 14 in end wall 13. Alternatively, no vent need be used in this embodiment as chamber 12 may be filled with air or other gas. The fluid space 17 communicates with the interior of the bellows 4 through a passageway 18. It will be understood that this entire cavity is completely filled with the fluid so that as its temperature increases its volume increases proportionally to cause bellows 4 to respond substantially linearly with the temperature of the fluid. As bellows 4 expands, valve rod 1 is drawn to the left in its guide 15 to reduce the clearance between the conical valve 2 and its port 3 and at the same time increases the length of the path through the valve communicating between chamber 6 and 7. Except for the fact that this valve is reversed in direction and a different bellows mechanism is used, the operation of the valve is identical with that described for FIGURE 1. It will be appreciated that this embodiment has some advantages over the very elementary type of structure shown in FIGURE 1 in that the bellows is driven in a very positive manner by the expanding fluid whereas the type of bellows shown in FIGURE 1 is somewhat less sensitive and usually has more resilience.

FIGURE 3 discloses a valve mechanism of the same type shown in FIGURE 2. However, in this case the damping fluid from chamber 17 communicates directly with space 12 surrounding the bellows 4 by reason of the aperture 18 connecting these two chambers. Bellows 4 is attached at one end to end wall 13 while the opposite end is directly connected to valve rod 1 which is free to move axially through its guide 15. This bellows is either partially evacuated or filled with a suitable gas, preferably at low pressure. As the fluid which fills enclosure 19 expands, it collapses bellows 4 to actuate valve 2 in the same manner as described for FIGURE 2. The embodiment disclosed in FIGURE 3 is a preferred type in that enclosure 19 is completely sealed and no vent is required through end wall 13. It will be appreciated that the embodiment of FIGURE 1, if applied in a practical structure, would permit a small leakage of the fluid from chamber 6 through the guide 15 into chamber 12, thereby permitting a loss of fluid. In the case of the structure of FIGURE 2 where the fluid fills the inside of bellows 4 such loss cannot take place. However, it is preferred that the bellows be collapsed rather than extended by the expanding fluid.

Where the rate of fluid flow is in direct proportion to the angular velocity of the mechanism to be damped and where the type of valve structure disclosed in this invention is employed, it can be shown that the damping coefficient is equal to a constant times the hydraulic resistance of the valve. This hydraulic resistance can be shown to be proportional to the viscosity of the damping fluid, the length of the valve and the reciprocal of the cube of the radial clearance between the conical valve 2 and the inner surface of its port 3. Because of the geometry of the conical valve structure and the linear motion imparted thereto by the bellows, it can be shown that this resistance factor is proportional to a linear function of the temperature change and inversely proportional to a cubic power series of the temperature change. The coefficients and constants of this expression are related directly to the geometry of the valve structure and the rate at which the bellows responds to the temperature change. The principal parameters involved are the initial radial clearance, the initial length of the valve, the angle of the cone of the valve and the temperature response constant of the bellows. By suitably proportioning these parts to meet the requirements of a particular mechanism to be damped, the resistance factor of the damping coefficient can be made to remain substantially constant with changing temperature. It is not necessary that all of the parameters be used in every case.

FIGURE 4 illustrated a conical valve structure in which the length parameter L remains constant since the conical valve structure 2 is made sufficiently long to extend completely through the port formed in wall 16 which separates the two chambers 6 and 7. In this case, the bellows action causes the valve to change only the radial clearance between the conical valve and its port. Since this action can be shown to provide the necessary cubic power series mentioned above, substantial tracking of the viscosity change can be provided so as to keep the resistance factor constant. In some cases this will be quite satisfactory without involving the length parameter L. Where it is not, the length of the cone 2 is shortened so as to provide the action illustrated for the conical valve in FIGURE 1.

Compensation may also be afforded by means of a constant radial clearance and varying valve length as illustrated in FIGURE 5. However, since the cubic power series is unavailable in this instance, satisfactory compensation is provided only over a very narrow temperature range. Therefore, while this type of valve mechanism has utility for narrow ranges, it is not preferred for most practical embodiments.

A practical embodiment of the invention involving the pump 10, the two chambers 6 and 7 and the valve mechanism is shown separated in the exploded view of FIGURE 6. In this case, two valve rods 1 are employed and are connected to the bellows 4 by a bracket 20. As illustrated each of these valve rods 1 have conical ends 2 of the type illustrated in FIGURE 1. For this reason the bellows is of the type which expands as temperature increases. The two valve rods 1 pass through the pair of guides 15 in guide block 21. The valve plate 22 provides the wall 16 between the chambers 6 and 7. The pump 10 consists of a pair of pump vanes or pistons 23 extending from a cylindrical support 24. It will be understood that support 24 and vanes 23 are integral and are driven in a rotary manner by the mechanism to be damped. Vanes 23 extend through apertures 25 in a pump casing 26 and, by reason of their rotary motion, cause a displacement of the fluid within casing 26 so as to drive the fluid through the valve ports between a pair of chambers corresponding with chambers 6 and 7 of FIGURE 1. Each of vanes 23 enter separate pump chambers in pump casing 26, these chambers being separated by a pair of partitions 27. As each vane is moved, it reduces the volume on one side of its chamber and correspondingly increases the volume on the other side. The valve ports are situated so that one of the pump vanes forces the damping fluid through one of the valves from the pump side into a cavity forming chamber 6 (shown in FIGURE 7) in guide block 21. This cavity communicates with a return aperture 28 in valve plate 22 so that the fluid thus forced through the valve passes through the aperture 28 to the other side of partition 27 and on the side of the second vane 23 where its chamber volume is increasing. The second vane 23 similarly forces fluid through its aperture 28 in valve plate 22 into a second cavity in guide block 21, through the second valve, and back to the pump chamber containing the first vane 23 on the side of increasing volume. It will thus be seen that the two vanes 23 each drive fluid through a valve port from one chamber to a second chamber.

FIGURE 7 shows a partial assembly and cross-section of the pump mechanism shown in the expanded view of FIGURE 6. In this figure the vanes 23 are shown separated from the pump casing for clarity. It will be understood, however, that in assembly these vanes are brought through apertures 25 (see FIGURE 8) in the end wall of pump casing 26 and into the space comprising chamber 7. Only a very small clearance exists between the vanes and the adjacent surfaces of valve plate 22 and casing 26 and between cylinder 24 and the outside of the end wall of pump casing 26.

One of the apertures 25 is illustrated in FIGURE 8 which is a partial cross-section of an end view of the pump and valve assembly of FIGURE 7 with the pump vanes 23 and their supporting cylinder 24 removed. Here the partitions 27 are clearly shown in their relation to the valve ports 3 and the return apertures 28.

The embodiment shown in FIGURE 9 is a partial assembly of the type of structure schematically disclosed in FIGURE 2 wherein the bellows 4 is extended by expansion of the damping fluid with increasing temperature. In this figure the enclosure 19 contains three chambers 12, 17 and 17A, respectively. Chamber 12 encloses the bellows 4 and is exposed to the atmosphere by means of a vent not shown in this figure but corresponding with vent 14 of FIGURE 2. Valve rods 1 extend through the bellows and are attached to bracket 20 which also serves as the movable end of the bellows. The guide block 21, valve plate 22, pump casing 26 and cylindrical support 24 containing the pump pistons are assembled in the order shown in FIGURE 7 and are here shown attached to a mounting plate 35 which in turn is supported by an annular shelf on the inside of casing 19. Secured with plate 35 is the lower plate 36 of the bellows 4. An aperture 18 extending through both plates connects chamber 17 with the interior of bellows 4.

From the previous description it will be apparent that cylinder 24 is rotatable about its axis to operate the pump vanes inside of pump casing 26. Integral with cylinder 24 is a hub 30 which is secured to a shaft 31 rotatable in a bearing 32 in bearing plate 33. Bearing plate 33 is secured, as shown, to a second annular shelf integral with enclosure 19. Chamber 17 is connected with chamber 17A through one or more apertures 34 in bearing plate 33. Structure 11 schematically illustrates a mechanical system which is to have its rotary motion damped by the device of this invention. Shaft 31, therefore, is secured integrally with mechanism 11 and it is to be understood that the lower end of mechanism 11 is similarly supported by a suitable bearing secured to the lower end of enclosure 19, not shown in this figure. It will thus be apparent that mechanism 11 is completely surrounded by the damping fluid filling the chamber 17A and that the damping fluid also completely fills chamber 17 and the interior of bellows 4. As the temperature of this fluid increases, it expands, thus forcing bellows 4 to extend and draw valve rods 1 upwardly. Referring momentarily to FIGURE 2, it will be seen that this action causes the conical valve 2, located inside of valve plate 22 of FIGURE 9, to both reduce its clearance and increase its axial length. Alternatively, as previously described, this valve may have a constant axial length so that only the radial clearance is reduced.

From what has been said it is quite apparent that mechanism 11 may be of any type, as for example, the outer gimbal of a gyroscope or an accelerometer mechanism.

It will also be evident that where the mechanism need not be surrounded by the damping fluid a suitable seal may be included at the bearing 32 so that mechanism 11 may be exposed to the atmosphere or may be otherwise external of the enclosure 19. It will also be apparent that any one of the valve structures disclosed in FIGURES 1, 2, 4 or 5 may be employed provided a suitable bellows is employed to drive the valve in the proper direction with increasing temperature. Also, the number of valve rods which may be employed is not limited to one or two as previously illustrated herein but may consist of a greater number so long as the pumping means is properly constructed to drive the fluid between a pair of chambers on either side of each valve. Other modifications will be obvious to those skilled in the art.

I claim:

Motion damping means including: an enclosure; said enclosure having two spaced apart shelves and defining three chambers, a convoluted bellows in a first one of said chambers; said bellows being connected at one end to plate means mounted on one of said shelves and at the other end to a plate like bracket; valve rod means connected to said bracket and extending through said plate means; valve means and rotary pump means mounted in a second one of said chambers and between said shelves, said valve means including fluid control means that is connected to said valve rod means, said pump and valve means having interconnected fluid passages and said fluid control means controlling the flow of fluid through said passages; a bearing plate secured to the other of said shelves; a rotary structure in a third one of said chambers and including a bearing shaft rotatably mounted relative to said bearing plate and connected to a rotary member of said rotary pump means for rotation thereof; damping fluid filling said second one of said chambers, said third one of said chambers and the interior of said bellows; and means communicating fluid flow from said third one of said chambers to said second one of said chambers and from said second one of said chambers to the interior of said bellows, whereby said bellows is adapted to respond to pressures created by said damping fluid due to temperature changes thereof and actuate said fluid control means to control the flow of fluid through said passages in proportion to the temperature of said damping fluid.

References Cited by the Examiner
UNITED STATES PATENTS

| | | | |
|---|---|---|---|
| 1,870,871 | 8/32 | Richard | 188—87 X |
| 1,914,677 | 6/33 | Schultz | 188—100 |
| 2,212,426 | 8/40 | Mitereff | 188—88 X |
| 2,602,461 | 7/52 | Walker | 137—468 |
| 2,822,789 | 2/58 | Philips et al. | 251—122 |
| 2,864,256 | 12/58 | Haagens et al. | 74—5.5 |
| 2,910,146 | 10/59 | Peterson | 188—90 X |
| 2,945,380 | 7/60 | Pope et al. | 74—5.5 |

EUGENE G. BOTZ, *Primary Examiner.*